United States Patent
Campbell

[11] 3,797,312
[45] Mar. 19, 1974

[54] THERMOCOUPLE HYGROMETER AND METHOD

[75] Inventor: Eric C. Campbell, Providence, Utah

[73] Assignee: Wescor, Inc., Logan, Utah

[22] Filed: Feb. 14, 1973

[21] Appl. No.: 332,540

[52] U.S. Cl. .................................. 73/336.5, 73/73
[51] Int. Cl. ........................................ G01m 25/56
[58] Field of Search ............ 73/336.5, 17 A, 75, 29, 73/64.2, 77

[56] References Cited
UNITED STATES PATENTS
3,204,418   9/1965   Mathews........................... 73/336.5

Primary Examiner—Richard C. Queisser
Assistant Examiner—Denis E. Corr
Attorney, Agent, or Firm—Lynn G. Foster

[57] ABSTRACT

A thermocouple hygrometer and method for determining the osmolality and water potential of small samples wherein the apparatus comprises a duty cycle control system including a controlled dual output generator, one output of which is set by a control circuit to match the characteristics of the thermocouple being used, and a level comparator which receives, during the DEW POINT mode, at one input a sawtooth wave form voltage from the generator and at the other input a composite of a square wave form voltage from the generator and the amplified voltage across the thermocouple. Thus, the level comparator output duty cycle varies and at any one point in time is established by the potential across the thermocouple. Reading occurs when the sawtooth wave form is high and the output voltage of the comparator is low. Cooling (or heating as may be required) occurs when the level comparator output is high. Accordingly, as the thermocouple potential stabilizes from a higher to a lower value, it will cause a cooling duty cycle to decrease and the amount of read time to increase. Before the generator is utilized, a zero offset control is used to adjust the thermocouple potential to zero under dry conditions. A cool current circuit, during cooling, causes a comparator controlled current to flow to the thermocouple, causing a temperature change at that location. By maintaining a balance of energy into a wet thermocouple with the energy loss at the thermocouple to its surroundings, the temperature change, measured by the thermocouple voltage, is proportional to the actual osmolality or water potential of the sample. The voltage from the thermocouple is communicated to a microvolt meter where it is amplified by a chopper stabilized amplifier. For a brief time interval each cycle, a sample hold circuit holds the previous amplified voltage output, which is displayed and/or recorded on one or more suitable devices. Apart from the DEW POINT mode, the device has a ZERO mode for dry calibration and a MAX COOL mode where the thermocouple potential is not fed to the level comparator, thereby creating a 95 percent cooling duty cycle under control of a generator for accelerating temperature equilibration at the thermocouple.

14 Claims, 3 Drawing Figures

THERMOCOUPLE HYGROMETER AND METHOD

BACKGROUND

1. Field of Invention

This invention relates broadly to the measuring of osmolality and water potential, and more particularly to thermocouple hygrometric measuring of osmolality and water and/or solvent potential.

2. Prior Art

Psychrometers of the past have generally been of two types, wet loop psychrometers and Peltier thermocouple psychrometers, each type being relatively large and expensive and requiring precise control for satisfactory results. Where prior art psychrometers have been used under laboratory conditions, a carefully controlled temperature bath has been required, resulting in excessive time delay in reaching temperature and vapor pressure equilibrium in order to produce accurate readings. I am aware of the following prior art publications:

ZOLLINGER, W.C. et al. 1966. A Comparison of Water-Potential Measurements Made Using Two Types of Thermocouple Psychrometer. Soil Science Vol. 102, No. 4, pp. 231–239.

CAMPBELL, G.S. et al. 1966. Sample Changer for Thermocouple Psychrometers: Construction and Some Applications. Agronomy Journal Vol. 58, pp. 315–318.

CAMPBELL, G.S. et al. A Welding Technique for Peltier Thermocouple Psychrometers. pp. 1–6.

CALISSENDORFF, C. et al. 1970. Construction And Calibration of An In Situ Leaf Psychrometer With Small Temperature Sensitivity. W-67 Regional Research Report. pp. 1–6.

RAWLINS, S.L. et al. 1967. Psychrometric Measurement of Soil Water Potential Without Precise Temperature Control. Soil Science Society of America Proceedings Vol. 31, No. 3 pp. 297–300.

RAWLINS, S.L. et al. 1968. In Situ Measurement of Soil and Plant Leaf Water Potential. Soil Science Society of America Proceedings Vol. 32, pp. 468–470.

DALTON, F.N. et al. 1968. Design Criteria For Peltier-Effect Thermocouple Psychrometers. Soil Science Vol. 105, No. 1 pp. 12–17.

RAWLINS, S.L. 1966. Theory For Thermocouple Psychrometers Used To Measure Water Potential In Soil And Plant Samples. Agricultural Meterology Vol. 3 pp. 293–310.

WIEBE, HERMAN E. et al. 1968 or later. Measurement of Water Potential Gradients in Trees. pp. 4–14.

OBJECTS AND SUMMARY OF THE INVENTION

The present invention provides method and apparatus for making osmolar and water potential measurements from small samples placed in a closed chamber as the function of current-induced temperature change in the form of a voltage signal at a thermocouple disposed in the chamber when the energy delivered to the thermocouple is balanced by the energy lost by the thermocouple to its surroundings. A duty cycle control system generates control voltage signals to vary at essentially the optimum duty cycle during which the temperature of the thermocouple is changed, as opposed to the time during which the output voltage signal is read. A solid state, low-noise, low-drift volt meter comprises a chopper stabilized amplifier with a precision voltage gain and a sample signal hold circuit which delivers, during reading, the amplified thermocouple voltage signal to a display and feeds the same signal back to the duty cycle control system whereby the variable duty cycle is implemented, and holds the previous voltage signal at its output when cooling occurs. This switching technique allows the thermocouple signal to appear as a continuous reading at the display during and after temperature equilibration occurs.

With the foregoing in mind, it is a primary object of the present invention to provide an improved system for determining osmolality and/or water potential of samples.

It is a further and important object of the present invention to provide a system for measuring osmolality and the like which is more economical to fabricate and easier to use.

It is an additional paramount object of the present invention to provide a highly accurate hygrometer which is more rapid to use, requiring less warm up time and no individual attention during equilibration and calculation phases.

It is a further significant object of the present invention to provide a hygrometer which provides for better health care wherein very small samples, e.g. of urine and blood, are tested.

It is a further object of the present invention to provide an improved system for measuring osmolality which can be used by paramedics having limited technical background and training.

Another important object is the provision of a novel thermocouple system for determining osmolality and water potential wherein the duty cycle, during which the temperature of the thermocouple changes, is varied from a greater to a lesser interval as temperature equilibration occurs.

A further significant object of the present invention is the provision of a precision voltage gain amplifying and sample signal hold circuit in a hygrometer providing for rapid change in the thermocouple temperature to equilibrium and a continuous read out for operator convenience and to avoid interpretive errors.

These and other objects and features of the present invention will be apparent from the following detailed description, taken with reference to the accompanying drawings.

DETAILED DESCRIPTION OF THE EMBODIMENT

Reference is made to two printed publications, i.e. *A Dew Point Hygrometer for Water Potential Measurement*, Paper No. 72–436, Eric C. Campbell et al, published by the American Society of Agricultural Engineers, June, 1972, and *Instruction Manual HR-33 Dew Point Microvoltmeter*, May, 1972, available from Wescor, Inc., 459 South Main Street, Logan, Utah 84321, for a more detailed explanation of the theory and operation of thermocouple osmometers, hygrometers, psychrometers and the like by which osmolality and/or water potential measurements are made than is available in this specification. It is to be appreciated that phrases such as "thermocouple psychrometer," "thermocouple osmometer," "thermocouple hygrometer," and "thermocouple transducer" are generically synonymous. It is in this generic sense that these phrases are used herein, even though, primarily as a result of refinement within the art, precise scientific distinctions can now be made between at least some of the mentioned phrases. As used herein, the terms "osmolality" and "water potential" are to be interpreted as including all parameters which can be derived from relative solvent vapor pressure.

In summary, the present invention utilizes a junction J comprising part of a thermocouple T (FIGS. 1 and 2) which is disposed within a sample chamber of a psychrometer. One suitable sample-receiving device is disclosed in my copending U.S. Pat. application Ser. No. 113,846, filed Feb. 9, 1971, for PSYCHROMETER AND METHOD, now U.S. Pat. No. 3,738,629, issued June 19, 1973, and assigned to the same assignee as this application. The change in temperature at the thermocouple junction J will cause water to condense on the junction with the heat of condensation driving the temperature at the junction to the dew point or water will evaporate from the junction with the cooling of evaporation lowering the temperature. With this invention, changes in temperature due to energy loss to the surroundings where the sample is being tested are compensated by an appropriate counterflow of energy from the circuit connected to the thermocouple; the remaining change in thermocouple temperature is caused by latent heat of vaporization. The change in temperature or temperature depression at the thermocouple required to reach the dew point will, using the energy balance mentioned above, be proportional to the voltage across the thermocouple.

With the foregoing in mind, the present invention provides a system for measuring osmolality or water potential which eliminates almost all error in such measurements and where the duty cycle (cooling versus reading time) is a controlled variable for improved accuracy. The reading or measurement is made and processed only when the thermocouple junction temperature has reached the dew point and is no longer changing. A generator is used to produce both a square wave and a sawtooth wave to be used at the input of a level comparator with a D.C. voltage to provide a precision linear voltage to duty cycle ratio. Use is made of a chopper stabilized amplifier for switching between thermocouple and reference voltages. During cooling, a sample hold circuit holds the amplifier reading.

To better understand the present invention, where condensation occurs, the energy ($q_p$) out of the thermocouple junction is balanced by the energy ($q_c$) into the thermocouple junction from circuitry connected to the junction. By definition $$q_p = K\Delta T$$

where $K$ is a constant, and $\Delta T$ is temperature depression of the thermocouple and $$q_{object\ of} = KL\pi_v/\alpha$$

where $K$ is the same constant, L is the chopping duty cycle of cooling during each cycle, $\alpha$ is a thermocouple calibration factor, and $\pi_v$ is a cooling coefficient for a given thermocouple which results from passage of optimum cooling current through the junction.

A necessary condition to cause the wet junction temperature to converge on the dew point is that $q_c = q_p$, this can be accomplished by setting, $L = \alpha\Delta T/\pi_v$ defined as follows $$V_o = \alpha\Delta T \times 10^5$$

which is done by setting $$L = V_o/\pi_v \times 10^5$$

where $V_o$ = output voltage readout

Thus, by deriving $\pi_v$, the output voltage can be used to regulate the duty cycle so that the time of cooling is controlled and the ultimate readout is an accurate reflection of the true temperature change at the thermocouple junction at which no evaporation or condensation will occur.

Figure 1:
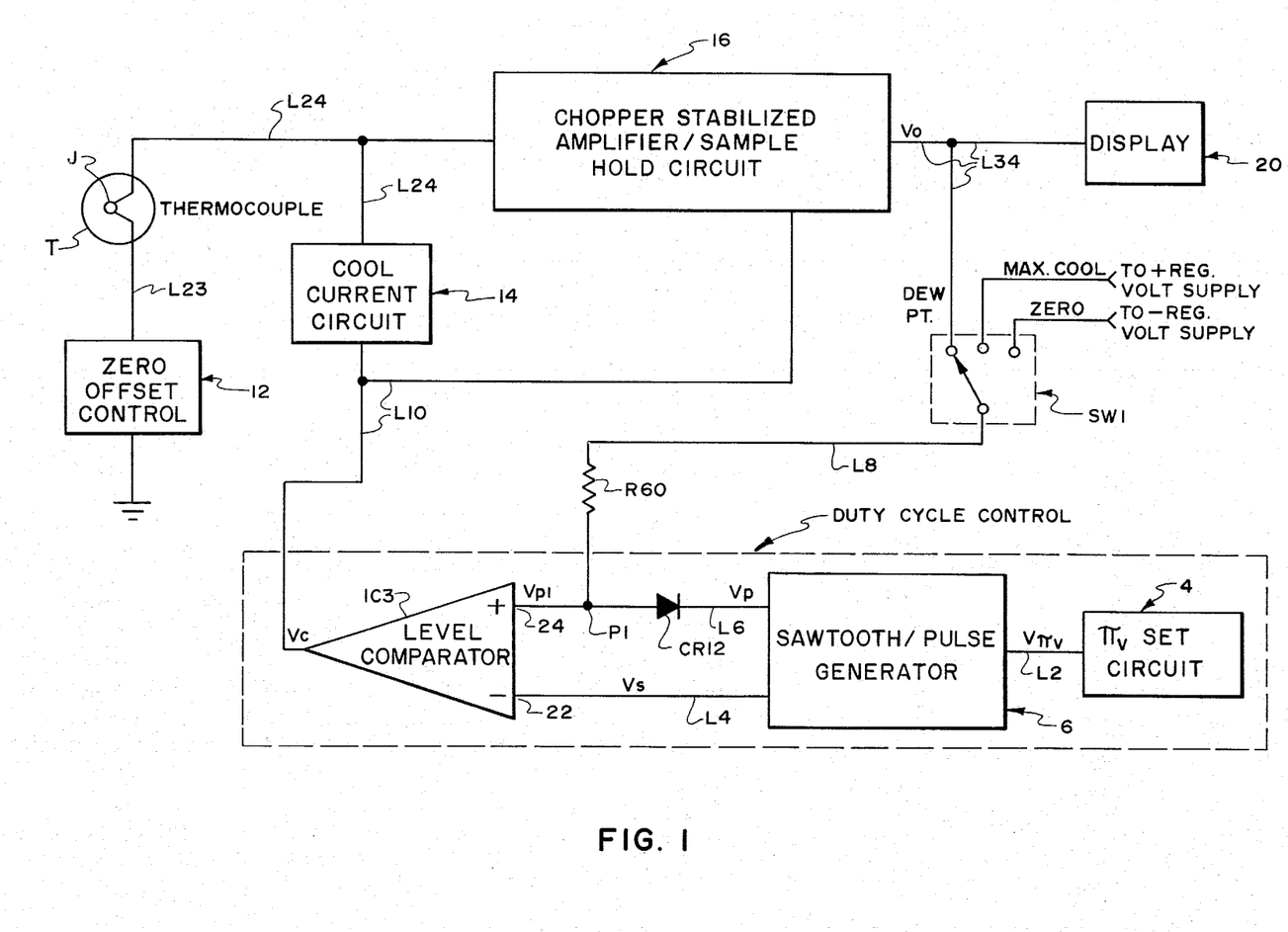
FIG. 1 is a block diagram of a presently preferred system according to the present invention.

With the foregoing as background, reference is now made to FIG. 1, which schematically illustrates a presently preferred system for measurement of osmolality and water potential, the required power supply and voltage regulator not being shown in FIG. 1. The system of FIG. 1 may be manually placed in one of three modes by setting switch SW1. When switch SW1 is in the ZERO position, it connects with the negative regulated voltage supply (hereinafter to be described), no cooling can occur at the thermocouple junction J and the system remains in a read only mode. In this position, the operator is able to adjust zero offset control 12 to insure that the output voltage, $V_o$ at display 20 reads zero.

The switch SW1, when connected to the MAX COOL terminal, joins the switch to the positive regulated voltage supply (later to be explained) which fixes the duty cycle L at 95 percent cool/5 percent read at the thermocouple. This is necessary to insure that some water (or other solvent) is on the thermocouple junction.

When switch SW1 is set in the DEW POINT mode, a variable cooling duty cycle will exist which is proportional to the thermocouple voltage output, for a given thermocouple where $\pi$ is constant. Ultimately a highly accurate reading at display 20 is obtained in a manner hereinafter to be more fully described.

$\pi_v$ set circuit 4 constitutes a resistive voltage divider interposed between the positive regulated voltage supply ($+V_r$), the output voltage ($V\pi_v$) thereof being equal to $\pi_v \times 10^5$.

$V\pi_v$ is communicated to sawtooth/pulse generator 6 along line L2. A generator 6 uses high gain operational amplifiers as comparators and integrators to produce a sawtooth voltage output $V_s$ which is delivered directly, along L4, to the negative input terminal 22 of level comparator IC3. $V_s$ constantly varies, but the time rate of change is held constant. Thus, the leading and trailing slopes of the sawtooth are precisely linear. The height of the sawtooth wave form is adjusted by the $\pi_v$ set circuit such that for a given thermocouple the cooling duty cycle, as discatated by the thermocouple temperature change signal, will compensate preicisely for the amount of heat which is flowing into or out of the junction in respect to its surroundings. If the water on the junction then causes a movement of the junction temperature toward the dew point, in the temperature depression method, the output signal will change, dictating a corresponding change in the cooling duty cycle, and thus maintaining a balance of thermo-energy being conducted into and out of the junction.

In the MAX COOL mode reading will constitute 5 percent, but such will vary in the DEW POINT mode depending upon $V_o$. The generator 6 also creates and delivers at L6 a square wave pulse, the positive interval of which is 95 percent of the total period and the negative of which is 5 percent of the total period. L6 is connected across a diode CR12 to the positive input terminal 24 of the level comparator IC3. Line L8 joins the switch SW1 to L6 at point P1 between the diode CR12 and the positive input terminal 24 of IC3.

Thus, with switch SW1 in the ZERO position, the voltage at point P1 is a constant equal to the maximum negative voltage of the square wave pulse. With switch SW1 in the MAX COOL position, voltage $V_o$ is not communicated across resistor R62 point P1 and, accordingly, the voltage at P1 is at all times equal to the square wave pulse passed to L6 by generator 6, the positive interval equaling 95 percent and the negative interval 5 percent of each cycle.

In the DEW POINT mode the positive voltage at point P1 will at any point in time be voltage $V_o$, the negative voltage at P1 equaling the negative voltage of the square wave pulse passed across diode CR12. The duty cycle of $V_c$ will thus vary, depending upon the value of $V_o$. Diode CR12 is of such a nature that when the voltage $V_p$ at line L6 adjacent the generator 6 is maximum positive, no current crosses the diode and, therefore, the voltage at P1 will be the same voltage as $V_o$.

The high gain operation amplifier IC3 which functions as a level comparator such that, when the voltage $V_{p1}$ at its positive input terminal 24 is higher than the voltage $V_s$ at the negative input terminal 22, the voltage output $V_c$ of IC3 is high. When the voltage $V_s$ is higher than the voltage $V_{p1}$, IC3 voltage output $V_c$ is low, the composite voltage output $V_c$ comprising a square wave as shown at (c) in FIG. 3. This voltage output ($V_c$) is delivered along line L10 to cool current circuit 14 and to circuit 16.

Zero offset control 12, which is connected to one terminal of the thermocouple T by L23 comprises a resistive voltage divider interposed between the positive and negative regulated voltage supplies, $+V_r$ and $-V_r$. By adjusting the divided voltage, the initial ZERO mode output voltage $V_o$ is set to equal zero, as the potential across thermocouple T is likewise zero. The resistive setting of control 12, once it is set, is left in the adjusted position for the remainder of the testing of a given sample.

Cool current circuit 14 functions such that it is off when the voltage $V_c$ is low. When the voltage $V_c$ is high, full flow of a controlled current along L24 and through the thermocouple T occurs, the amount of current being limited to essentially the optimum for the thermocouple being used.

Chopper stabilized amplifier/sample hold circuit 16 functions in one of two ways during the DEW POINT mode. When voltage $V_c$ is low, circuit 16 serves as a DC chopper stabilized amplifier with a precision voltage gain of $10^5$. During this time, as mentioned, cool current circuit 14 is off. When voltage $V_c$ is high, circuit 16 functions as a sample hold circuit holding the output voltage $V_o$, which appears at line L34, at a level equal to the voltage the last time $V_c$ was low. During this period of time cool current circuit 14 is on, supplying optimum current to the thermocouple.

Figure 2:
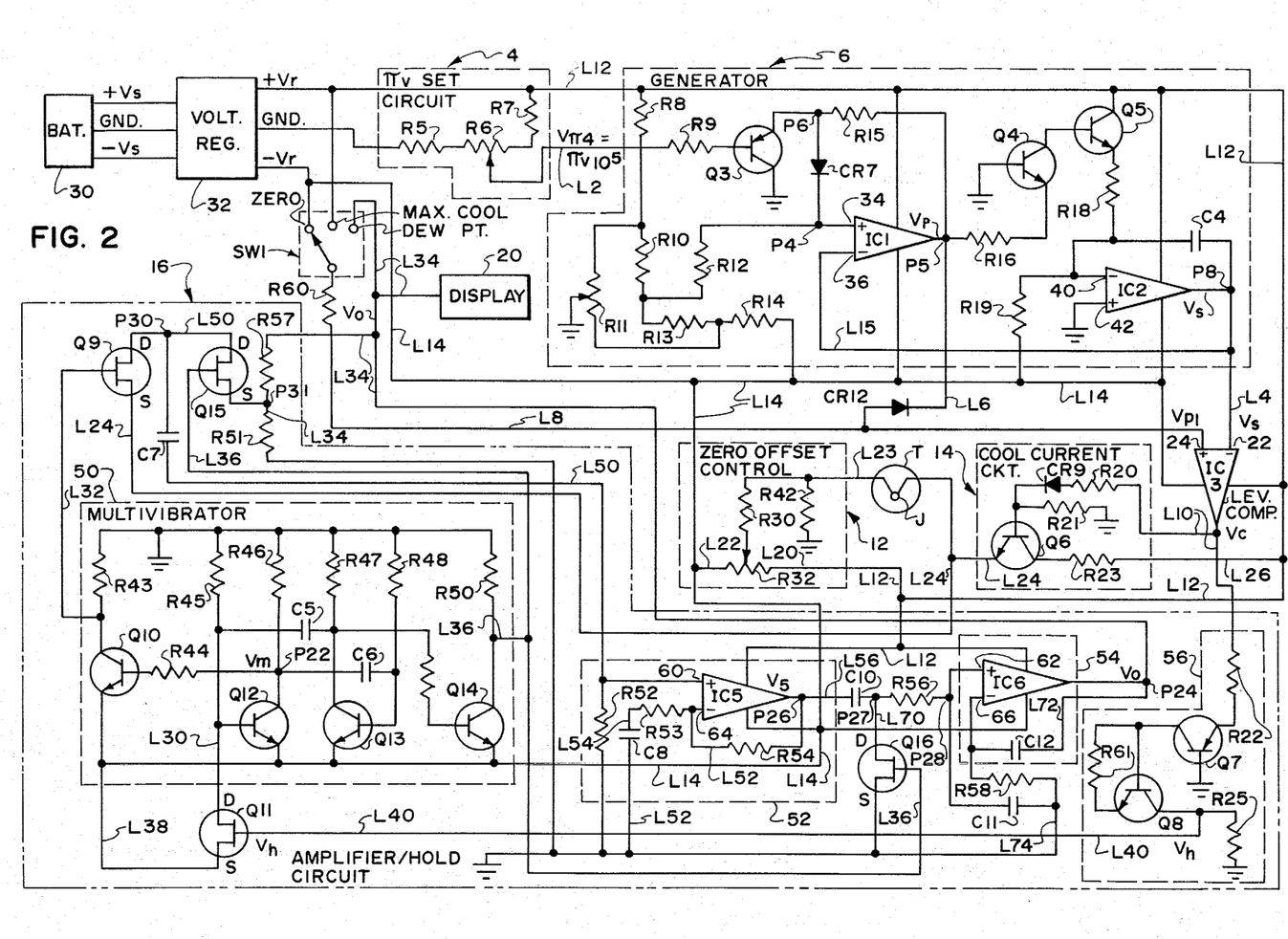
FIG. 2 is a circuit diagram corresponding to the system of FIG. 1.

For a more specific understanding of the present invention, reference is now made to FIG. 2. A battery 30 or other suitable power supply provides positive and negative voltage supplies ($+V_s$, $-V_s$) in addition to a ground terminal. A suitable voltage of ±18–20 volts operates well with the embodiment of the invention shown in FIG. 2.

A voltage regulator 32, comprising well known state of the art circuitry, produces a regulated voltage supply of $+V_r$ and $-V_r$. $+V_r$ is made available to the circuitry of FIG. 2 along L12 while $V_r$ is available along line L14. One suitable output level for the voltage regulator 32 is ±12 volts.

As mentioned earlier, $\pi_v$ set circuit comprises a resistive voltage divider interposed between $+V_r$ and ground which is set to produce $V\pi_v$ equal to $\pi_v$ times $10^5$. This becomes the max voltage $V_s$ and is also the amount of voltage required for the mentioned energy balance at the thermocouple. Resistors R5 and R7 set the range of the potentiometer at R6 of circuit 4, for example between 2.5 and 10 volts, where $+V_r = 12$ volts. The value of $V\pi_v$ can be arrived at by the manufacturer and designated to the user. Alternatively, the user may substantially determine $V\pi_v$ as the voltage $V_o$ exhibited on the display 20 with the switch SW1 at MAX COOL and the thermocouple junction J dry.

In short, circuit 4 is adjusted until no energy flow occurs across the thermocouple; therefore, the output of the thermocouple is constant.

Voltage $V\pi_v$ is input along line L2 to the sawtooth-/pulse generator 6. Generator 6 comprises a resistive adjustment network comprising resistors R8, R10, R13, R14 and R11 to insure that the voltage which crosses resistor R12 is zero when the voltage $V_p$ at the output of comparator IC1 is low. In other words, the mentioned resistive network insures ground potential at the positive input terminal 34 of IC1 when the output thereof $V_p$ is low.

The voltage input along line L2 is communicated to comparator IC1 across resistor R9, along the base and emitter of transistor Q3, across diode CR7 to the positive terminal 34 of IC1. Diode CR7 functions as a rectifier preventing current at P4 from reaching P5. Transistor Q3 functions to regulate voltage reaching point P6. Resistor R15 limits the current flow from P5 through Q3 when the voltage $V_p$ at P5 is high.

As can be appreciated by examining FIG. 2, IC1 has at its negative input terminal 36 connected at P8 to a feedback loop L15 from the output of integrator IC2. Also, IC1 and IC2 are respectively interposed between $+V_r$ supply line L12 and $-V_r$ supply line 14 at the side terminals thereof.

Resistor R16, interposed between the output of IC1 and the emitter of transistor Q4 restricts the current flow from transistors Q5 and Q4 to IC1 when $V_p$ is low and transistor Q5 is on. Transistor Q4 insures that transistor Q5 is off when $V_p$ is above ground potential.

When transistor Q5 is on, current flow across the transistor passes through resistor R18 and capacitor C4 to point P8. Voltage $V_s$ at point P8 constantly varies and the time rate of change is constant. $V_s$ is delivered to the negative terminal 22 of IC3 along line L4. Integrator IC2 is a high gain device as are those other herein similarly designated devices. With all of the devices designated IC if the voltage of the positive terminal is high and the voltage of the negative terminal low, the output voltage will be high and if the opposite conditions prevail, the output voltage will be low. The inputs to each IC are high impedance and, therefore, little or no current passes. IC2 tries to keep the voltage at the minus terminal 40 and at the positive terminal 42 at the same level, i.e. at ground.

The mentioned linearity of the sawtooth slopes of the voltage wave form appearing at P8 are insured or controlled by capacitor C4, which is not ceramic and therefore subject to leakage but rather a high quality mylar capacitor.

By reason of the mentioned connection between IC1 and IC2 when the voltage $V_p$ is high at P5, the voltage at P4 equals the output voltage of $\pi_v$ set circuit 4. When the voltage $V_p$ is low at P5, the voltage at P4 is zero because no current passes through resistor R15 and diode CR7. Reiterating, when transistor Q5 is on, the voltage $V_p$ at P5 is low; when transistor Q5 is off then the voltage $V_p$ at P5 is high. The voltage at P5 is accordingly controlled by IC1, i.e. when the voltage at P4 is higher than the voltage $V_s$ at P8, which is also the voltage at the negative terminal 36 of IC1. When the voltage $V_p$ at P5 is low, transistor Q5 is turned on and the voltage $V_s$ at P8 is low. When the voltage $V_s$ at P8 is zero, IC1 inverts and goes high and sets the voltage at P5 at a value required by circuit 4, i.e. $v \times 10^5$. Usually this voltage, where a regulated 12 volt source is relied upon, is between 4 and 8 volts depending upon the characteristics of thermocouple being used.

It should be observed that when the positive terminal 34 of IC1 is high, the voltage $V_p$ at P5 is high and the voltage $V_s$ at P8 starts to move up, thereby defining the leading linear slope of the sawtooth wave form. Conversely, when $V_p$ is low, $V_s$ is defining the trailing linear slope of the sawtooth wave. The voltage $V_p$ at P5 is communicated across diode CR12 to the positive terminal 24 of the level comparator IC3 while the voltage $V_s$ at P8 is communicated along line L4 to the negative input terminal 22 of IC3.

Figure 3:
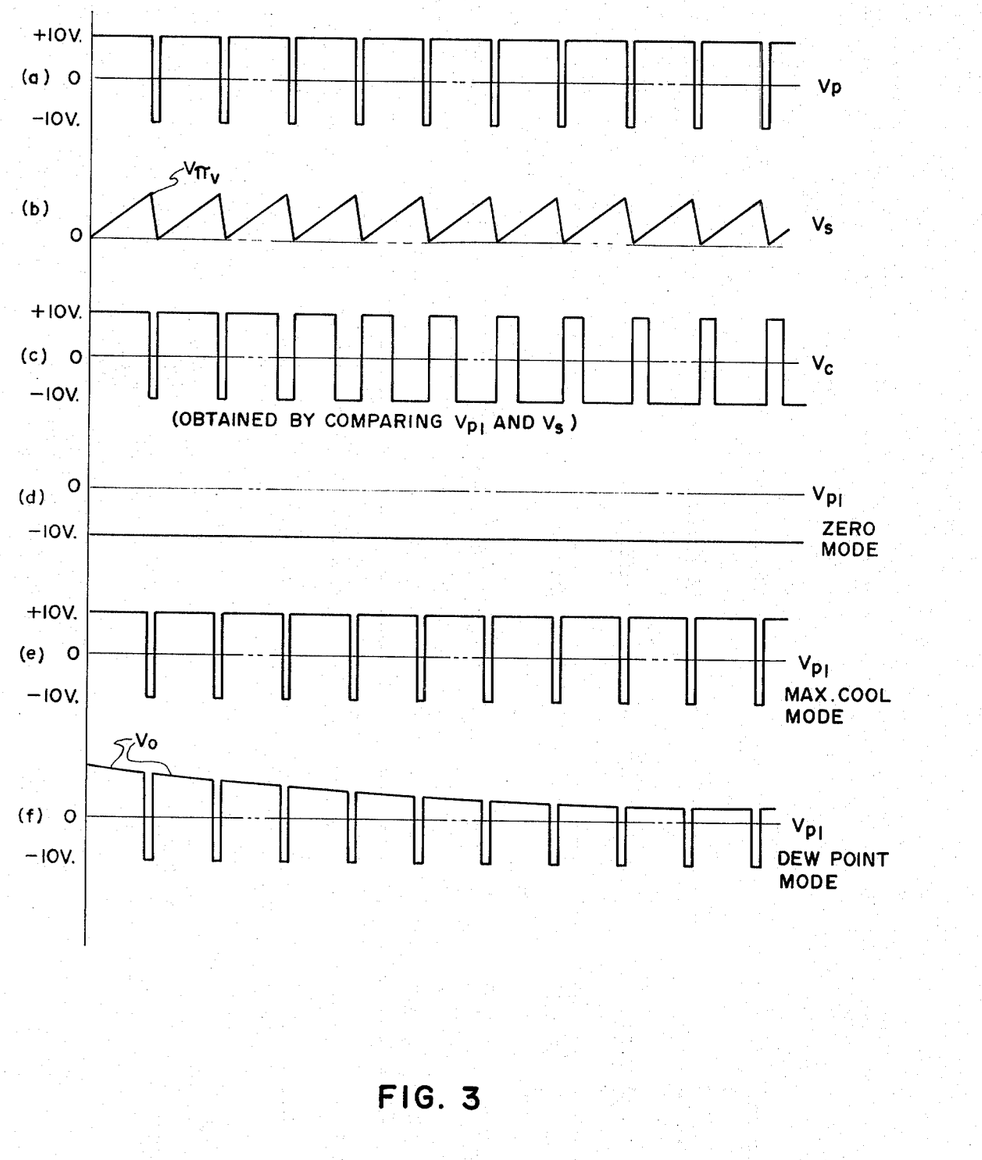
FIG. 3 is a graphic representation of certain signal wave forms which occur at various locations within the system of FIGS. 1 and 2.

Thus, in the manner described above, the generator 6 issues at line L6 a voltage $V_p$ as shown at (a) of FIG. 3, the shown voltage wave form values being based upon regulated supply voltage $V_r$ of 12 volts. The wave form generated at line L4 and communicated to terminal 22 is the integral of the square wave form of FIG. 3 (a) and is shown at (b) of FIG. 3.

The voltage wave form $V_c$ produced at the output of IC3 is shown in (c) of FIG. 3 for the DEW POINT mode.

Wave forms shown at (d), (e) and (f) of FIG. 3 illustrate voltage $V_{p1}$ existing at point P1 during the ZERO, MAX COOL and DEW POINT modes, respectively.

As mentioned earlier, initially during the ZERO mode, the zero offset control 12 is set to adjust the potential across the thermocouple T to zero, causing $V_o$ to equal zero. This is true because the $V_o$ always equals $10^5 \alpha \Delta T$ and during the ZERO mode there is no temperature depression. More specifically, control 12 is interposed between regulated voltage supplies $+V_r$ and $-V_r$, said voltages being available at lines L20 and L22, respectively. The potentiometer of the control is adjusted until the reading at display 20 is zero, resistor R30 and R42 serving as a voltage divider for reducing the voltage from the wiper of the potentiometer R32 to a level consistent with the input range of circuit 16.

After control 12 has been used to set $V_o$ equals zero, the system is placed in MAX COOL mode, causing the voltage signal $V_c$, as illustrated at the extreme left of FIG. 3 (c), to be passed to the cool current circuit 14 and circuit 16. Cool current circuit 14 is connected to the thermocouple T at line L24, to the $+V_r$ voltage supply at line L26 and to the output of the level comparator IC3 at line L10. Resistor R21 assures that circuit 14 is off when the voltage $V_c$ is low. Thus, there is no current flow across resistor R20 and diode CR9 during that condition. When the voltage $V_c$ is high, there is current flow across resistor R20 and diode CR9. This current reaches the base of transistor Q6 turning it on and permitting current flow in a controlled amount to occur from the collector to the emitter of transistor Q6, this current reaching the thermocouple junction J. It is preferred that, when the $+V_r$ voltage is 12 volts, that about 8 milliamps of current reach the thermocouple T when the apparatus is used to measure dew point depression; however, the needed amperage will vary depending on the type and characteristics of the thermocouple used.

The diode CR9 prevents pulling of current from the thermocouple through the emitter and base of transistor Q6 and resistor R23 limits the current, as mentioned, to essentially the optimum amount for the thermocouple in question.

Specific reference is now made to circuit 16 of the FIG. 2 with the reminder that the circuit functions in one of two modes, i.e. (a) as a chopper stabilized amplifier when $V_c$ is low, with a precision voltage gain of $10^5$ and (b) as a sample hold circuit holding the voltage $V_o$ at the level indicated the last time voltage $V_c$ was low. In other words, when circuit 14 is off circuit 16 functions as a precision amplifier and when circuit 14 is on supplying the necessary milliamps of current to the thermocouple, the circuit 16 holds the previous $V_o$ voltage output.

More specifically, circuit 16 comprises four field effect transistors (FET) Q9, Q11, Q15 and Q16, Q11 being a P channel FET and transistors Q9, Q15 and Q16 constituting N channel FETs. The circuit 16 also comprises a state-of-the-art multivibrator 50 which differs from off the shelf equipment only in that the base of transistor Q12 thereof is tied to the D terminal of FET transistor Q11 by line L30. It is this arrangement which facilitates the sample hold condition. The circuit 16 also includes an A.C. amplifier circuit 52 having a precision voltage gain of $10^5$ as well as a non-inverting integrator 54. Also, circuit 16 includes a gate driver circuit 56 for converting the voltage $V_c$ to the levels required by Q11.

FET transistor Q9 at its S terminal is connected to the thermocouple T by lead L24. The gate of Q9 is connected by lead L32 to the collector of transistor Q10. Thus, one multivibrator output is received at lead L32 and this turns Q9 on. The D terminal of Q9 is connected to the D terminal of FET Q15 and to the positive terminal 60 of IC5 across capacitor C7. Transistor Q15 at its S terminal is connected to line L34 at P31, which line contains resistors R57 and R51 on opposed sides of said connection. The gate of transistor Q15 is connected by line L36 to the collector of transistor Q14 of the multivibrator 50 such that the second output of the multivibrator occurs at L36. The gate of FET transistor Q15 also connects by line L36 to the gate of FET transistor Q16. Thus, as circuit 50 operates in its oscillator mode, FET transistor Q9 will be on when an output occurs at L32 and transistors Q15 and Q16 will be on when an output occurs at L36. The multivibrator outputs at lines L32 and L36 are identified except each is 180° out of phase with the other.

The state of FET transistor Q11 determines whether multivibrator 50 functions as an oscillator or is stopped allowing reading to occur in respect to $V_o$. More specifically, the S terminal of FET transistor Q11 is connected to the $-V_r$ voltage supply by lead L38 while the gate thereof is connected by lead L40 to circuit 56.

In respect to circuit 56, voltage $V_c$ is transmitted thereto along lead L10 across resistor R22 to the emitter of transistor Q7. Accordingly, when $V_c$ is low, Q7 is off, but turns on when $V_c$ is high. When transistor Q7 is on, it in turn causes the base of transistor Q8 to become conductive, turning Q8 on. Resistor R61 insures that transistor Q8 is off when transistor Q7 is off and resistor R25 is a current limiting resistor. By reason of the described circuitry of unit 56, the voltage $V_h$ emanating from circuit 56 along lead L40 will equal maximum negative when transistor Q8 is on and will be at ground potential when Q8 is off.

In view of the foregoing, it is evident that FET transistor Q11 is on when transistor Q8 is on and $V_c$ is high. When FET transistor Q11 is on, transistor Q12 of the multivibrator 50 is held off causing the voltage $V_m$ at point P22 within the multivibrator to be high. This keeps transistors Q10 and Q13 on, keeping transistor Q14 off. This allows the voltage at line L36 to go high. This is because FET transistors Q9, Q15 and Q16 are off when the gate is at $-V_r$ voltage since each mentioned FET is N channel. Since transistor Q11 is a P channel FET it is "on" when its gate is at $-V_r$. The described condition of multivibrator 50 when held to a single state by transistor Q11 is the sample hold condition.

When transistor Q11 is off, i.e. no negative voltage supply at the gate, transistor Q12 turns on which turns transistor Q13 off and oscillation of the multivibrator 50 resumes.

The manner in which the two high gain amplifiers IC5 and IC6 operate in such that the voltage output $V_o$ of IC6 at point P24 is the stable if the postive input terminal 62 thereof is at zero potential. The output $V_o$ of IC6 at P24 is high if the voltage at the positive terminal 62 is high, and the voltage $V_o$ of the output of IC6 is low if the voltage at the positive input 62 is low. The voltage output of IC6 is the positive integral of the voltage at its positive input 62.

It is to be appreciated that the voltage signal appearing on line L50 is alternating as transistors Q9 and Q15 turn off and on, respectively. When on alternating current is passed to positive terminal 60 of IC5, no A.C. will appear at the output of IC5 at P26. When provided with feedback loop L52 including resistor R54, IC5 constitutes a non-inverting A.C. amplifier. With resistor R53 and capacitor C8, disposed in line L52 which connects the negative terminal 64 of IC5 to ground, resistors R53 and R54 set the A.C. feedback gain on IC5, while capacitor C8 sets the D.C. feedback gain to one. Resistor R52, interposed between the positive terminal 60 of IC5 and ground sets the D.C. input bias to zero voltage.

It should be noted that capacitor C7 in line L50 as well as capacitor C10 in line L56 accommodates A.C. transfer to and from IC5. When there exists no alternating current at point P26, the voltage $V_o$ at P24 is held stable. This occurs during the sample hold operation, i.e. when transistors Q15 and Q16 are held on. The voltage at points P27 and P28 goes to zero as the same is drained to ground across transistor Q16. Conversely, when the voltage at P28 is high, the voltage $V_o$ at P24 will be high. This occurs when the voltage at terminal S (point P31) of transistor Q15 is at a low voltage. It should be noted that resistors R57 and R51 comprise gain feedback resistors causing the voltage at point P31 to equal $10^{-5} \times V_o$. Ultimately, the voltage at P31 will equal the voltage at terminal S of Q9 at a point in time when no A.C. exists at line L50. At this point in time the output of IC6 becomes constant. Therefore, $V_o$ sets the voltage at P31 such that $V_o$ equals $10^5 \times$ the thermocouple output voltage which crosses Q9. This is the precision gain needed to appropriately control the duty cycle as indicated earlier. In the indicated manner, the exact potential of the thermocouple is ascertained at a time when the heat transfer out of the junction from the circuit equals the heat transfer into the junction from the surroundings with the junction wet. This is representative of the dew point depression.

It should be observed that the D terminal of FET transistor Q16 is connected by line L70 to line L56 at point P27 and the S terminal of transistor Q16 is connected to ground. Consequently, transistor Q16 is a demodulator and sets the D.C. reference at point P27.

Resistor R56 and capacitor C11 serve a damping function to eliminate any A.C. component of signals passed to positive input 62 of IC6.

Resistor R58 and capacitor C12 constitute a feedback loop comprising lines L72 and L74 connected between the output of IC6 at point P24 and the negative input terminal 66 of IC6. These components of the feedback loop set the A.C. gain on IC6 such that the gain is unity at very high frequencies.

Obviously, numerous variations and modifications may be made without departing from the present invention. Accordingly, it should be clearly understood that the form of the present invention described above and shown in the accompanying drawings is illustrative only and is not intended to limit the scope of the invention.

What is claimed is:

1. A system for determining osmolality and water and solvent potential of samples comprising:

a source of electrical energy to power the system;

a thermocouple with a junction disposed in a sample chamber;

means causing current to flow across the thermocouple junction at intervals to insure that water from a sample is on the thermocouple junction and to change the temperature of the thermocouple junction until equilibrium is reached;

switching means controlling said current means thereby causing current to flow across the thermocouple junction at said intervals;

voltmeter means connected to the thermocouple to measure the potential across the thermocouple caused by the mentioned temperature change;

read out means connected to the voltmeter means whereby said potential is made available in human readable form;

means balancing the thermal energy exchanged between the thermocouple and its surroundings by causing a like amount of thermal energy to be transferred between the current means and the thermocouple junction.

2. A system for testing the solvent potential and osmolality of samples comprising:
a souce of electrical energy to power the system;
a thermocouple with a junction disposed in a closed sample chamber;
means causing current to be and not to be delivered to the thermocouple junction at alternating time intervals, the temperature of the junction being changed after condensation of sample moisture thereon;
means sensing the potential across the thermocouple junction during the intervals when current is not being delivered to the junction;
means for making the potential available in human readable form;
means comparing the voltage signal comprising said sensed potential with a predetermined voltage signal and thereby causing the time lapse of said two types of intervals to vary from greater to lesser current flow of intervals as the change in temperature of the junction decreases.

3. A system for testing the solvent potential and osmolality of samples comprising:
a source of electrical energy to power the system;
a thermocouple with a junction disposed in a closed sample chamber;
generator means creating a reference voltage signal, the nature of which causes the known amount of thermal energy exchanged between the thermocouple junction and its invirons to be matched by thermal energy exchanged between the system and the thermocouple junction;
means causing current to be and not to be delivered to the thermocouple junction at alternating time intervals, the temperature of the junction being changed after condensation of sample moisture thereon;
means sensing the potential across the thermocouple junction during the intervals when current is not being delivered to the junction;
means for making the potential available in human readable form;
means comparing the voltage signal comprising said sensed potential with the reference voltage signal from the generator and thereby causing the time lapse of said two types of intervals to vary from greater to lesser current flow intervals as the change in temperature of the junction decreases.

4. A system for testing the solvent potential and osmolality of samples comprising:
a source of electrical energy to power the system;
a thermocouple with a junction disposed in a closed sample chamber;
means causing current to be and not to be delivered to the thermocouple junction at alternating time intervals, the temperature of the junction being changed after condensation of sample moisture thereon;
means sensing the voltage signal across the thermocouple junction;
precision gain means amplifying said sensed voltage signal;
means retaining the voltage signal created during one current interval as the voltage during the next current interval is ascertained;
means causing said retained voltage signal to be displayed in human readable form.

5. A system for testing the solvent potential and osmolality of samples comprising:
a sensor disposed in a closed sample chamber;
a variable duty cycle control causing time sharing between application of current to the sensor and measurement of the sensor's voltage output;
means delivering current at spaced intervals of time upon command by the duty cycle control;
a voltmeter sensing the voltage signal output and communicating the same to the duty cycle control whereby when maximum temperature change at the sensor is occuring, the time interval during which current is applied to the sensor is relatively large compared to the interval during which the voltage signal sensor output is measured and when the change in temperature at the sensor is relatively small the intervals during which the sensor output voltage signal is measured are relatively long in comparison to the time during which current is applied to the sensor.

6. A method of testing the moisture potential and osmolality of samples, the steps of:
cyclically delivering and not delivering current to the junction of a thermocouple disposed in a closed sample chamber;
causing moisture to coat the exterior of the junction;
measuring the voltage of the thermocouple junction during each interval when current is not delivered to the junction; and
displaying the measured voltage in human readable form.

7. The method of claim 6 wherein said displaying step comprises maintaining the display of each cyclically measured voltage during the next succeeding current delivering step whereby a continuous voltage display results.

8. A system for testing the moisture potential and osmolality of samples comprising:
a thermocouple with a junction disposed in a closed sample chamber;
means cyclically causing current to be and not to be delivered to the thermocouple;
means cyclically sensing the voltage created at the junction during each current delivering phase;
means holding each sensed voltage while the next succeeding current delivering phase occurs;
means displaying each held voltage until the next sensed voltage is available for display.

9. A method of varying the duty cycle to gain optimum balance between spaced time intervals when a sample sensor receives current and alternate time intervals when the voltage at the sensors read comprising:
feeding back each sensed voltage signal to a duty cycle control;
comparing each fed back voltage signal with a predetermined voltage signal;
decreasing the length of intervals during which current is received by the sensor and increasing said read interval as the difference between the fed back voltage signal and the predetermined voltage signal decreases, and vice versa.

10. An amplifier/signal hold circuit comprising:

an oscillator having two output conductors where equal and opposite output signals appear during oscillation;

one output conductor being connected to the gate of a first field effect transistor and the other output conductor being connected to the gate of a second field effect transistor whereby said field effect transistors are alternately switched off and on;

a common conductor connecting opposed first terminals of the two field effect transistors whereby output signals from said field effect transistors alternately appear;

means communicating a sensed input voltage at the second terminal of the first field effect transistor and means communicating a reference voltage to the second terminal of the second field effect transistor;

means connecting the common conductor to an amplifier having means causing a precision voltage gain of each sensed signal appearing on the common conductor;

a signal hold circuit receiving each output voltage signal from the amplifier and holding the same until the next output voltage signal is received by the signal hold circuit;

output means causing each held voltage signal to appear in human readable form.

11. The circuit of claim 10 wherein the sample hold circuit comprises a solid state non-inverting integrator, wherein said amplifier comprises a solid state chopper stabilized DC amplifier and further comprising a third field effect transistor connected to one side of the oscillator and to a source of electrical energy at its other terminal, the gate being connected to receive signals derived from said sensed input voltage whereby when said third field effect transistor is on, the oscillator is restrained against oscillation causing the second field effect transistor to remain on until an input voltage is again to be sensed.

12. A circuit of claim 11 further comprising a demodulator field effect transistor interposed between ground and one input of the non-inverting integrator whereby each output voltage signal from the non-inverting integrator is held until the next voltage signal is received by the integrator.

13. A method of amplifying and holding cyclically processed voltage signals, the steps of:
  sensing voltage at a sensing station where current is cyclically delivered;
  communicating a reference voltage and the sensed voltage to a switching station;
  passing the reference voltage through the switching station to a precision voltage amplifier when current is being delivered to the sensing station;
  passing the sensed voltage through the switching station to the precision voltage amplifier only when the current is not being delivered to the sensing station;
  delivering an amplified voltage output from each sensed and passed voltage;
  creating an output voltage signal from each amplified voltage output so derived;
  holding each output voltage signal until the next successive output voltage signal is created;
  displaying each held output voltage signal.

14. An osmometer comprising:
  a source of electrical energy to power the osmometer;
  a thermocouple with a junction disposed in a closed sample chamber;
  duty cycle control means comprising:
    a voltage signal generator outputting a sawtooth voltage wave form;
    a bistable voltage comparator having a first input to which said sawtooth voltage wave form is communicated;
    means causing the sawtooth voltage wave form to vary linearly between zero and a level proportional to the potential across the thermocouple with current flowing essentially continuously therethrough when the thermocouple is dry;
  means sensing and processing voltage signals occurring at the junction of the thermocouple when the junction is wet during sample testing said last mentioned means comprising:
    a chopper stabilized amplifier processing sensed thermocouple voltage signals only when current is not flowing across the thermocouple and imparting a precision voltage gain thereto, said chopper stabilized amplifier comprising a bistable solid state component;
    the output of said chopper stabilized amplifier being communicated to a voltage hold circuit comprising a bistable solid state device the output from which occurs following receipt of an amplified signal from the amplifier and is retained until the next successive amplified signal is received;
    feedback means communicating the signal hold output to the second input of the bistable level comparator;
    means communicating the voltage hold output to a display;
    means communicating the output of said bistable level comparator to the means comprising the amplifier and signal hold circuit;
    means for delivering current to the thermocouple; and
    means connecting the bistable level comparator output to the current delivering means whereby current is delivered to the thermocouple at spaced intervals of time and the voltage at the thermocouple is processed to the amplifier between said current intervals, the level comparator varying the duty cycle during which current is delivered to the thermocouple.

* * * * *